(12) United States Patent
Mikheev (10) Patent No.: US 8,024,941 B2
(45) Date of Patent: Sep. 27, 2011

(54) METHOD OF OPERATING AN ADSORPTION REFRIGERATION SYSTEM

(75) Inventor: Valdimir Mikheev, Oxon (GB)

(73) Assignee: Oxford Instruments Nanotechnology Tools Limited, Oxon (GB)

(*) Notice: Subject to any disclaimer, the term of this patent is extended or adjusted under 35 U.S.C. 154(b) by 167 days.

(21) Appl. No.: 11/925,404

(22) Filed: Oct. 26, 2007

(65) Prior Publication Data

US 2008/0209920 A1 Sep. 4, 2008

(30) Foreign Application Priority Data

Mar. 1, 2007 (GB) .................................. 0703988.6

(51) Int. Cl.
*F25B 15/00* (2006.01)
(52) U.S. Cl. ............................................ 62/483; 62/101
(58) Field of Classification Search ............... 62/55.5, 62/101, 405, 483, 487
See application file for complete search history.

(56) References Cited

U.S. PATENT DOCUMENTS

| 4,831,829 A * | 5/1989 | Jones et al. ...................... 62/3.2 |
| 5,829,270 A * | 11/1998 | Mikheev .......................... 62/610 |
| 2004/0089017 A1 * | 5/2004 | Mikheev et al. ................ 62/480 |

FOREIGN PATENT DOCUMENTS

| EP | 1387133 | 2/2004 |
| EP | 1785680 | 5/2007 |

* cited by examiner

*Primary Examiner* — Frantz F Jules
*Assistant Examiner* — Emmanuel Duke
(74) *Attorney, Agent, or Firm* — Blank Rome LLP (57) ABSTRACT

A method is provided of operating an adsorption refrigeration system. The system includes a primary adsorption pump which is arranged in communication with a primary chamber containing coolant, a secondary adsorption pump and a high fluid impedance conduit which places the secondary adsorption pump and primary chamber into communication. The method includes saturating the primary and secondary adsorption pumps with coolant while each pump is at its respective operational temperature. The pumps are then heated above their operational temperatures to desorb the coolant such that the coolant pressure in the primary chamber and the secondary adsorption pump substantially equalizes through the conduit while the primary chamber is cooled. The secondary adsorption pump is then cooled causing coolant gas to be adsorbed and, therefore, a reduction in temperature and pressure of the coolant in the primary chamber is effected. The primary adsorption pump is then cooled to an operational temperature causing adsorption of the coolant and, therefore, a reduction in temperature and pressure of the coolant in the primary chamber.

11 Claims, 6 Drawing Sheets

METHOD OF OPERATING AN ADSORPTION REFRIGERATION SYSTEM

REFERENCE TO RELATED APPLICATION

The present application claims the priority of British Patent Application No. GB 0703998.6, filed Mar. 1, 2007. The disclosure of the application is hereby incorporated by reference in its entirety into the present disclosure.

FIELD OF INVENTION

The present invention relates to a method of operating an adsorption refrigeration system, together with a system suitable for performing the method.

BACKGROUND OF THE INVENTION

Adsorption refrigeration systems are well known in the field of refrigeration and particularly cryogenics, for providing very low temperatures in a region such as a chamber. Adsorption refrigeration systems operate by the provision of an amount of liquid coolant within a chamber to be cooled. This is placed in gaseous communication with an amount of adsorbing material such as charcoal, the entire system being closed such that the amount of coolant within the system remains constant. Typically the coolant in liquid form is obtained by condensation of gaseous coolant in contact with the cold walls of a member pre-cooled by an external source. This is performed in many conventional adsorption refrigeration systems by the use of a "1K pot".

A second and alternative method of obtaining liquid coolant uses an expansion process, in which case the coolant is decompressed from a high pressure under adiabatic conditions. This decompression causes liquefaction of the gas thereby generating the liquid coolant. The adsorption material of the system is arranged to adsorb the gas above the liquid coolant such that further evaporation of the liquid occurs due to the corresponding reduction in the pressure. The latent heat of evaporation causes a reduction in the temperature of the system.

One problem with using such systems is that they are effectively "single-shot", meaning that they may only be operated for a predetermined period of time which, in commercial systems, may be a number of hours.

Adsorption systems are advantageous in that they are relatively simple devices which can be re-charged by simply heating the adsorption material so as to cause desorption of the coolant gas thereby returning it to the gaseous state. Upon sufficient subsequent cooling, the adsorption material can once more be reused. Since the systems are "closed", there is no loss of coolant and there are no moving parts. This is beneficial in that low temperature experiments can be performed at low levels of vibration for many hours.

In order to address the relatively short time period "single-shot" nature of such systems, we have previously devised a method of operating an adsorption refrigeration system in accordance with our earlier European patent application EP1387133A, the disclosure of which is hereby incorporated by reference in its entirety into the present disclosure. This system involved the expansion of the coolant within the chamber into an auxiliary volume member (which may be a further adsorption pump) so as to effectively pre-cool the coolant prior to the use of the main adsorption pump. Effectively this produced a lower starting temperature and thereby improved the operational period of the system.

The abovementioned system as disclosed in EP1387133A is particularly advantageous over the prior art although in some circumstances, such as where extremely stable conditions are required, the operation of the valve (such as valve 8 in FIG. 1 thereof) causes mechanical vibrations, which is disadvantageous. There is a further desire, in addition to overcoming this problem, to reduce the cost of manufacture of the apparatus, to simplify its operation and to increase its operational reliability. It is these problems, among others, that are addressed by the present invention.

SUMMARY OF THE INVENTION

In accordance with a first aspect of the present invention, we provide a method of operating an adsorption refrigeration system, the system comprising a primary adsorption pump which, in use, is arranged in communication with a primary chamber containing coolant, a secondary adsorption pump and, a high fluid impedance conduit being arranged to place the secondary adsorption pump and the primary chamber in fluid communication, the method comprising the following steps: (i) charging the primary and secondary adsorption pumps with coolant while the primary and secondary adsorption pumps are at their respective operational temperatures; (ii) heating each of the primary and secondary adsorption pumps above their operational temperatures to desorb the coolant such that the coolant pressure in the primary chamber and the secondary adsorption pump substantially equalizes through the conduit while cooling at least the primary chamber; (iii) cooling the desorbed coolant in the primary chamber; (iv) cooling the secondary adsorption pump to its operational temperature at which coolant gas is adsorbed by the secondary adsorption pump, thereby causing a reduction in temperature and pressure of the coolant in the primary chamber; and (v) cooling the primary adsorption pump to an operational temperature at which coolant is adsorbed by the primary adsorption pump, thereby causing a further reduction in temperature and pressure of the coolant in the primary chamber.

We have realized that, with careful design of the system, together with the corresponding operational pressures and other factors, including the type of coolants used, it is possible to use the primary and secondary adsorption pumps in conjunction with the high fluid impedance conduit so as to remove the need for a valve.

The invention is based upon the realisation that a high flow rate of coolant can be achieved through a high fluid impedance conduit if there is a high pressure differential between the ends of the conduit, whereas a low pressure differential results in a low flow rate. The invention is further based upon the phenomenon that the adsorptive material of an adsorption pump has a higher coolant adsorptive capacity when the coolant is at a high pressure in comparison with when it is at a low pressure.

The method begins at step (i) in which each of the primary and secondary adsorption pumps have their adsorption material saturated with coolant. At this time, the adsorption pumps are each held at their respective operational temperatures. These may of course be different temperatures although typically these temperatures are the same for each pump. The operational temperature in each case may be defined as the temperature at or below which a substantial adsorptive effect is provided by the adsorption material within the adsorption pump. Such temperatures are cryogenic temperatures.

Step (ii) involves the heating of each of the primary and secondary adsorption pumps to temperatures above their operational temperatures and this causes the desorption of the coolant which, since the system is closed, causes the pressure of the coolant to rise substantially. The fluid impedance of the conduit is arranged such that, taking into account this elevated pressure, together with the time over which step (ii) is performed, the pressure of the coolant is altered to equalize between the secondary pump and the primary chamber.

Preferably during step (iii) the coolant gas is cooled to cryogenic temperatures typically less than 4.2 Kelvin by contact with a suitably cooled heat exchanger.

After the respective pressures have been substantially equalized and the working gas has cooled as in step (iii), the secondary adsorption pump is cooled to its operational temperature and this causes the coolant gas locally to be adsorbed by the secondary adsorption pump. This causes a reduction in the temperature and pressure of the coolant in the primary chamber via the conduit. The coolant is able to flow through the conduit since a pressure differential of around 1 atmosphere is established between the secondary adsorption pump and the primary chamber.

Once this cooling effect has been achieved, the primary adsorption pump is then cooled to its operational temperature and the coolant is then adsorbed by the primary adsorption pump, thereby causing a reduction in the temperature and pressure of the coolant in the primary chamber. Initially both the primary and secondary adsorption pumps are operational. The secondary adsorption pump will eventually stop pumping as it becomes saturated. The primary pump will continue to pump the coolant from the primary chamber. It will also pump some of the coolant from the secondary adsorption pump (due to the pressure dependency of the adsorptive material). However, since the pressure differential across the high fluid impedance conduit will be small, the coolant flow rate back into the primary chamber will also be very small. In the latter stages of step (v), the very lowest temperatures of desired cooling may be achieved over extensive periods (hours or days).

As will be appreciated, the coolant is primarily in gaseous form although during the cooling step (iv) at least, it precipitates as liquid due to the reduction in the pressure and temperature. Similar precipitation may also occur during step (v) when the primary adsorption pump is being cooled from a temperature above the operational temperature down to the operational temperature itself.

Step (v) can therefore be thought of as containing two subsidiary steps, the first being the cooling of the adsorption pump from a temperature above the operational temperature down to the operational temperature, and a second stage in which the pump operates in a conventional manner so as to cool the coolant in the primary chamber by the adsorption effect.

In addition to the system components described above, the system itself may further comprise an auxiliary reservoir which is arranged in selective fluid communication with the primary chamber interior and in this case the coolant may be supplied initially from the auxiliary reservoir in step (i). An auxiliary reservoir (which may be the same or different to the one used in step (i)), may again be arranged in selective fluid communication with the primary chamber interior and may be used in the method such that the coolant in the primary chamber is expanded into the auxiliary reservoir after or during step (iii) so as to further cool the coolant within the primary chamber. This enhances the cooling effect and ultimately provides for a longer "single-shot" performance for the primary adsorption pump. The pressure of the coolant and indeed the capacity of the auxiliary reservoir should be chosen carefully so as to maximize the beneficial effect of the use of such a reservoir. The method typically comprises controlling the temperature of the auxiliary reservoir so as to provide a pre-determined coolant pressure within the auxiliary reservoir. This may be achieved with suitable heating and/or cooling devices. The selective communication between the auxiliary reservoir and the remainder of the system is preferably provided by a suitable valve.

A number of different coolants may be utilized with the method and system of the present invention, these including helium-4, nitrogen, neon or hydrogen although it is particularly preferred to use helium-3 since this provides the capability of attaining the very lowest temperatures for experimental purposes. With the use of helium-3, the temperature of the coolant at the end of step (iv) is typically about 2 Kelvin and, following the operation of the primary adsorption pump at the operational temperature, the coolant is typically cooled to about 300 milliKelvin or lower.

In accordance with a second aspect of the present invention we provide an adsorption refrigeration system comprising a primary adsorption pump and a primary chamber, the primary adsorption chamber being adapted to contain coolant when in use and being in fluid communication with the primary adsorption pump; a secondary adsorption pump; and a high fluid impedance conduit being arranged to place the secondary adsorption pump and the primary chamber in fluid communication.

As will be appreciated, the arrangement of the primary and secondary adsorption pumps, the primary chamber and high fluid impedance conduit in accordance with the second aspect can be used to implement the general method in accordance with the first aspect of the invention.

The system may therefore further comprise an auxiliary reservoir where such an optional auxiliary reservoir is to be used, either for the initial charging of the system in step (i) or in an expansion step after step (ii) of the method as discussed above.

The function of the auxiliary reservoir may also be performed by a plurality of reservoirs. Therefore different reservoirs may be used to perform the initial charging and later expansion stages mentioned above, or indeed multiple reservoirs may be used for one or each of these stages. With multiple reservoirs, it is possible to perform the optional expansion process following step (ii) in a number of sub-steps so as to provide a multi-stage expansion process with, for example, consecutive pressure reductions. The method may therefore comprise expanding the gaseous coolant separately into a number of the reservoirs.

The auxiliary reservoir may take the form of a constant geometrical volume although it may be provided with a variable volume which allows the pressure within the chamber to be controlled and therefore the degree of cooling to be controlled accordingly. The or each auxiliary reservoir may therefore take the form of a further adsorption pump. Valves may be provided, as appropriate, to ensure the selective communication between the reservoir(s) and the remainder of the system.

The primary chamber typically comprises a primary pot for containing liquid coolant when in use. It is such a primary pot which achieves the lowest temperature within the system. The high fluid impedance conduit is therefore preferably arranged such that the fluid flow between the pot and the second adsorption pump is lower, preferably more than five times lower and preferably more than ten times lower, than that between the pot and the primary adsorption pump. Note that the flow rate from the primary pot to the primary adsorption pump is mainly influenced by the pumping speed of the primary adsorption pump.

The arrangement of the primary chamber is typically such that the chamber further comprises a primary pumping line connecting the primary pot and the primary adsorption pump such that the fluid impedance between the primary pot and the respective adsorption pump is that of the conduit and the primary pumping line respectively. In most practical circumstances this typically means that the primary pumping line has a diameter which is significantly in excess of that of the high fluid impedance conduit although of course the length of these respective components is also influential in the magnitude of the impedance.

In an analogous manner to the storage reservoirs, the secondary adsorption pump may itself take the form of a plurality of such adsorption pumps. Each of these may be arranged in fluid communication with the primary chamber interior using a respective high fluid impedance conduit. Therefore multiple instances of secondary pumps and high fluid impedance conduits may be provided. The secondary adsorption pumps may also be provided in series, separated by a high fluid impedance conduit. These may be operated in sequence such that one such pump is cooled to its operational temperature and performs its adsorption substantially before any other.

As will be appreciated, similar multiple adsorption pump arrangements may also be provided for the primary adsorption pump, this including a series arrangement.

Regarding the high fluid impedance conduit, it should be noted that this typically provides an invariable or static impedance. An example of such a constant fluid impedance conduit is as a capillary. It is therefore absent of any moving parts, and in particular a valve.

The system may further comprise the use of heat pipes such that the primary chamber may be coupled thermally to a heat pipe, the heat pipe comprising a sealed heat pipe chamber containing a coolant and having an upper region and a lower region in fluid communication with one another, such that when the system is in use, the primary chamber cools the upper region of the heat pipe with respect to the lower region whereby the coolant is condensed into coolant liquid and moves under gravity to the lower region. With regard to the heat pipe, the terms "upper" and "lower" relate to the operational position of the heat pipe with respect to a downward gravitational direction. A plurality of such heat pipes may be provided. Heat pipes are beneficial in that they improve the temperature stability achieved at the distal end of the heat pipe (lower region). This is achieved due to the intermediate cooling process (which is provided by the condensing coolant) which dampens any temperature instability within the system. Furthermore, the poor thermal conductivity of the coolant gas helps to break the link between the upper and lower regions thermally. Effectively therefore, a heat pipe effectively acts as heat diode.

A number of different types of target apparatus to be cooled, including experimental apparatus, may be placed in good thermal contact with the lower region of the heat pipe. In addition to experimental apparatus, the cooling effect of the lower region may also be used to cool further apparatus such as the condensation pump of a dilution refrigerator.

According to a third aspect of the present invention we provide a refrigeration system comprising a first adsorption refrigeration system according to the second aspect of the invention; a second adsorption refrigeration system according to the second aspect of the invention; and a cold platform adapted to be cooled by each of the first and second adsorption refrigeration systems.

With the use of first and second adsorption refrigeration systems cooling a common cold platform, the respective first and second systems may be operated in turn such that while one is being operated in a cooling mode, the other is being operated in a regenerating mode. This allows for a pseudo-continuous operation of the system thereby overcoming the limitations of single-shot use. The cold platform may take a number of different forms and typically is placed in thermal communication with the various types of target apparatus discussed above. One example of such a target apparatus is the still of a dilution refrigerator.

In some examples, each of the primary chambers has a respective condensation surface, these being provided within an enclosure containing coolant gas, the said surfaces being selectively cooled when in use by the primary adsorption pumps such that coolant gas condenses on the surfaces as liquid coolant. The cold platform is positioned to receive the liquid coolant from the condensation surfaces. The enclosure is adapted to provide a path of gaseous coolant between the respective condensation surfaces of the primary chambers, the path having a lower hydraulic impedance than that between each of the surfaces and the cold platform. The hydraulic impedance between the condensation surfaces is preferably at least two times lower, more preferably at least five times lower and most preferably at least ten times lower than that between the condensation surfaces and the cold platform. The enclosure may comprise a respective tube between each of the condensation surfaces and the cold platform, and a by-pass tube positioned between the respective condensation surfaces to provide the lower hydraulic impedance path. The respective tubes may comprise heat pipes. Alternatively, the condensation surfaces may be provided within a common chamber volume. The cold platform may be provided adjacent the common chamber. In this case, the distance between the condensation surfaces is typically less than the distance between each of the condensation surfaces and the cold platform itself.

BRIEF DESCRIPTION OF THE DRAWINGS

Some examples of a method and system according to the present invention are now described with reference to the accompanying drawings, in which:—

DETAILED DESCRIPTION OF THE EMBODIMENTS

Figure 1:
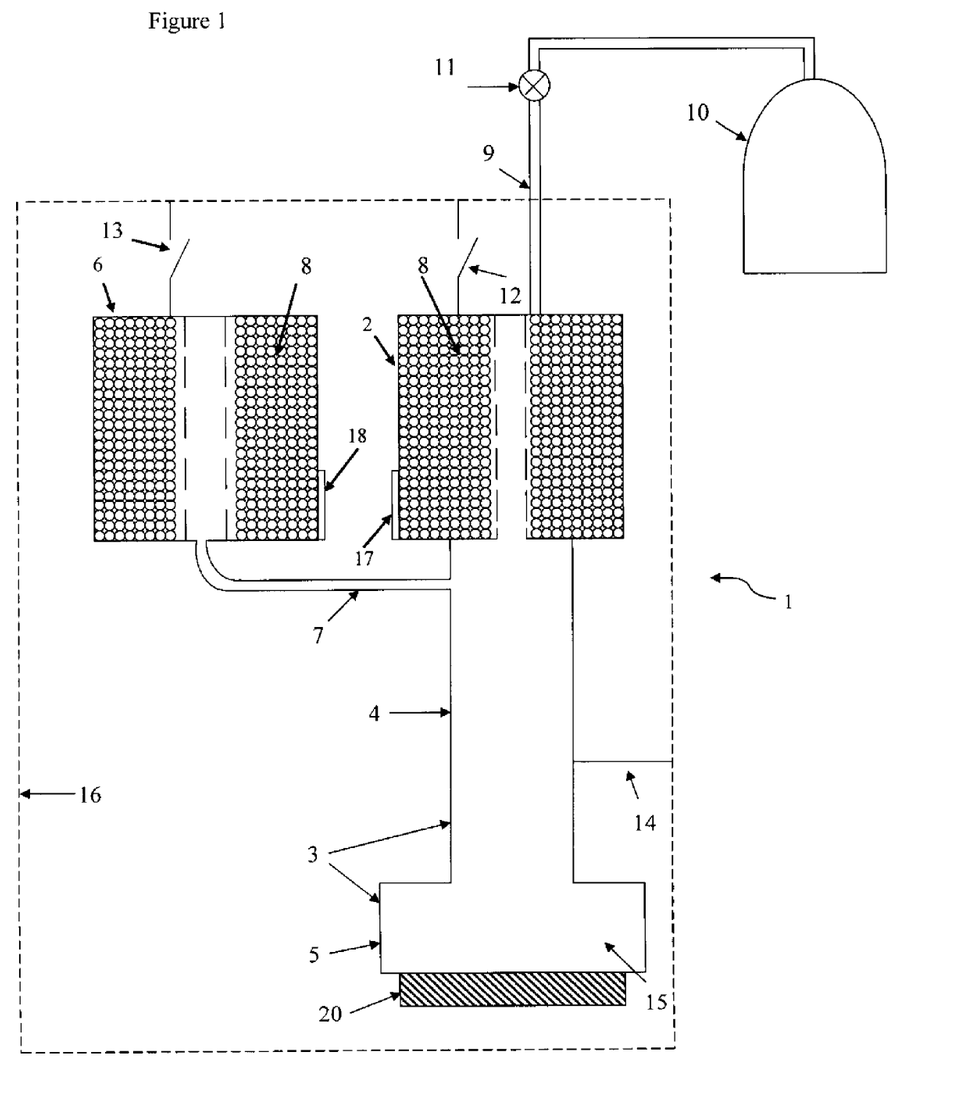
FIG. 1 shows a first example of an adsorption refrigeration system according to the invention.

FIG. 1 shows a schematic representation of a first example system which is generally indicated at 1. A primary adsorption pump 2 is connected to a primary chamber 3, the primary chamber comprising a primary pumping line 4 and a primary pot 5. As can be seen, the primary pumping line is effectively a large diameter tube (typical dimensions being a diameter of about 8 millimeters and a length of about 200 millimeters or less). At an upper end of the primary pumping line 4 is positioned the primary adsorption pump 2, and at a lower end is located the primary pot 5. This means that any gas within the pot 5 is in fluid communication with the interior of the primary adsorption pump 2. A secondary adsorption pump 6 is provided, this being placed in fluid communication with the interior of the pumping line 4 by virtue of a high fluid impedance conduit 7 in the form of a stainless steel capillary. This has a diameter of about 1 millimeter and a length of about 200 millimeters or less. As illustrated in FIG. 1, the high fluid impedance conduit is arranged such that the secondary adsorption pump 6 is positioned at one end and the primary pumping line 4 is positioned at the other end, of the conduit 7.

Each of the primary and secondary adsorption pumps 2 and 6 contain adsorptive material such as charcoal 8 which has a high surface area and has the material property of providing a large gas adsorption effect at an operational temperature (4.2 Kelvin).

A tube 9 is provided so as to connect the primary adsorption pump 2 to an auxiliary reservoir in the form of a storage vessel 10. The tube 9 therefore provides fluid communication between the primary adsorption pump 2 and the storage vessel 10. This communication is made "selective" by the use of a manual or automatic valve 11 placed within the tube 9.

A heat switch and heat exchanger assembly 12 is provided so as to control the temperature of the primary adsorption pump. Similarly, a heat switch and heat exchanger assembly 13 is provided to achieve a similar effect for the secondary adsorption pump 6. A further heat exchanger 14 is provided to cool the primary pumping line 4 so as to provide independent control of the temperature of the lower part of the primary pumping line 4 and pot 5 with respect to the temperature of the primary adsorption pump 2. Each of the heat switch and heat exchanger assemblies is in the form of a high thermal conductivity component connected through a heat switch to a heat sink. The heat switch in each case allows the respective heat exchanger to be thermally coupled in a selective manner to the heat sink which is in the form of the cryostat coolant bath or a cooling stage of a mechanical refrigerator.

The primary adsorption pump 2 is also provided with a heater 17 and, similarly, the secondary adsorption pump 6 is provided with a heater 18. The heaters, which are typically provided as electrically resistive elements in thermal contact with the charcoal 8, may be controlled so as to control the temperature of the respective adsorption pumps in combination with the respective heat exchangers 12, 13. A control system (not shown) is provided to achieve this.

In this example, the parts of the system in fluid communication with one another are filled with coolant 15, such as helium-3. It should be noted that the coolant 15 may be either gaseous, liquid or a mixture of both. In this embodiment, helium-3 is primarily within a gaseous state, although, during operation, some condenses as a liquid which collects in the primary pot 5. Coolant 15 may be different types of coolants based upon the application.

For the purposes of this example, the charcoal 8 is capable of adsorbing about four liters of coolant 15, whereas the storage vessel 10 has a capacity of about ten liters. The dashed line 16 in FIG. 1 indicates the presence of a helium-4 cryostat which operates at about 4 Kelvin. The components other than the storage vessel 10 and valve 11, are contained within the cryostat 16.

Figure 2:
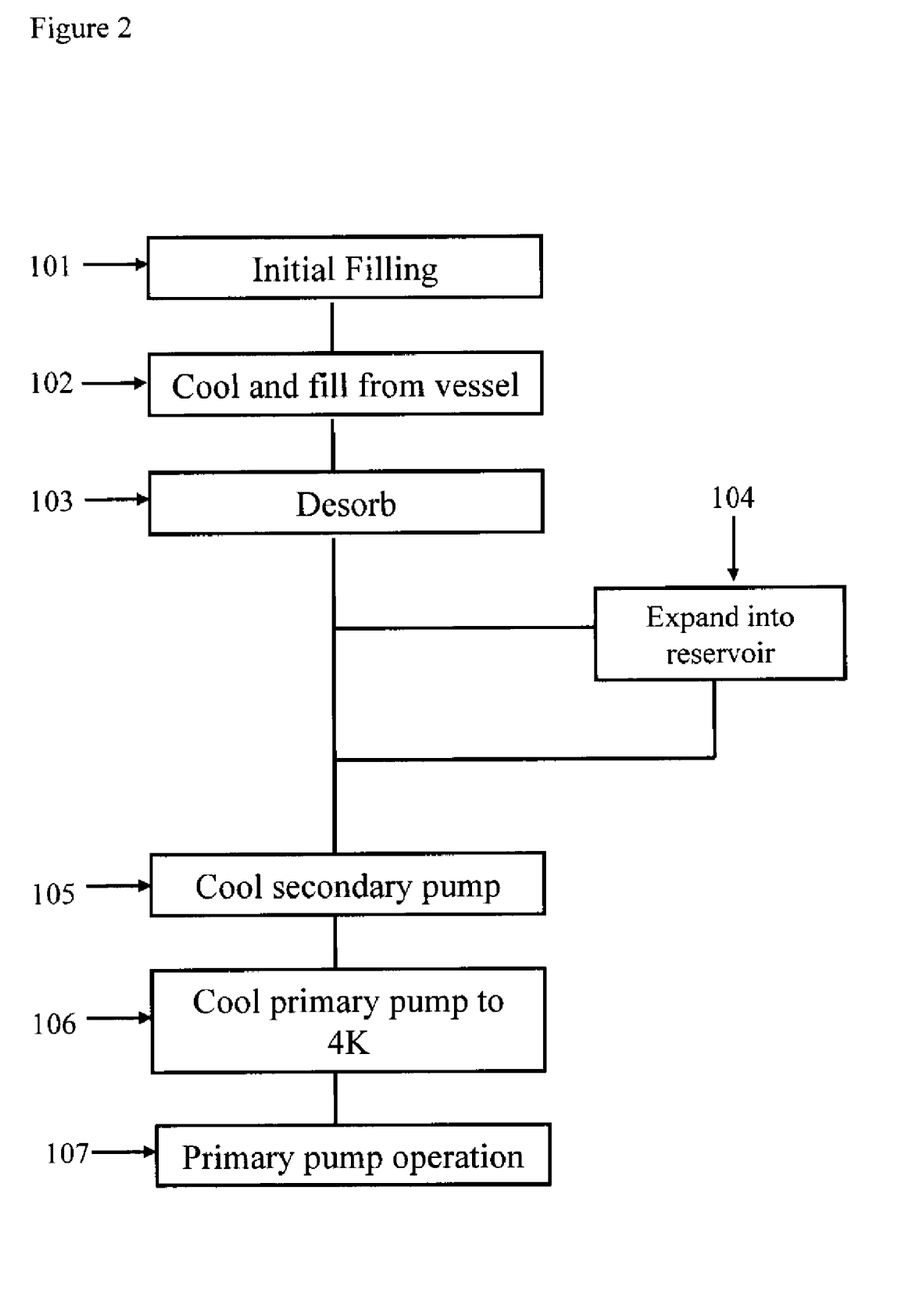
FIG. 2 is a general flow diagram of the operation of the example systems.

With reference now to FIG. 2, a method of operating the system of FIG. 1 is now described.

The method begins in step 101 of FIG. 2 where the interiors of the primary adsorption pump 2, primary chamber 3 and secondary adsorption pump 6 are filled initially with helium-3. At step 102 these components of the system are cooled in the cryostat to about 4 Kelvin. At this temperature the charcoal 8 within the adsorption pumps 2 and 6 is at an operational temperature and therefore fully adsorbs the coolant 15. During this stage the valve 11 is open. Once all components within the cryostat have substantially reached thermal equilibrium (at about 4 Kelvin) the valve 11 is closed. The system is arranged such that, when the charcoal 8 is in its charged state at the end of step 102, the pressure in the system is about 0.5 atmospheres of absolute pressure. This serves to reduce losses of the relatively expensive helium-3 through any leaks in the system.

At step 103, the switches 12 and 13 are opened and heaters 17 and 18 are each operated by the control system so as to heat the charcoal 8 in the respective adsorption pumps 2, 6 to a relatively high temperature (about 100 Kelvin). This heating causes the desorption of the helium-3 coolant 15 from the charcoal 8 and this significantly increases the gas pressure within the closed system. A pressure of 10 atmospheres (absolute pressure) is typically achieved. It is important to note at this stage that the heat exchanger 14 is operational so as to cool the desorbed gas and prevent the heat from the primary adsorption pump 2 in particular from reaching the primary pot 5. The coolant 15 in the lower part of the primary pumping line 4 and pot 5 therefore remains at approximately 4 Kelvin. The high pressure within the system ensures adequate coolant flow between the primary pumping line 4 and the secondary adsorption pump 6 despite the high fluid impedance of conduit 7. During the desorption step 103, the pressure in the coolant 15 in each of the primary and secondary adsorption pumps 2, 6 substantially equalizes.

In an optional step 104 (see FIG. 2), the valve 11 may be opened so as to cause the high pressure coolant to flow once more into the storage vessel 10. This is relatively rapid due to the low fluid impedance of the tube 9. This causes a reduction in the temperature and pressure of the coolant within the primary adsorption pump 2 and primary chamber 3. Similarly a pressure reduction is experienced in the secondary adsorption pump 6 due to the large difference in pressure between the secondary adsorption pump 6 and storage vessel 10. The valve 11 is then closed thereby resealing the system. Regardless of whether the optional step 104 is performed, a relatively high pressure remains within the primary adsorption pump 2 and chamber 3. With the performance of step 104 the pressure afterwards is of the order of 1 atmosphere.

At step 105, the secondary adsorption pump 6 is cooled by the operation of the heat exchanger 13 and the closing of its respective heat switch (with the heater 18 switched off). This causes a substantial reduction in the pressure within the secondary adsorption pump, this in turn causing a significant pressure differential between the secondary adsorption pump 6 and primary adsorption pump and chamber 2, 3. For this reason the coolant 15 flows through the high fluid impedance conduit 7 and therefore the secondary adsorption pump 6 reduces the pressure within the primary chamber 3 thereby causing cooling and liquefaction of the coolant 15 in the primary pot 5, the temperature of this coolant being around 2 Kelvin. It should be noted that the pressure within the primary chamber 3 and primary adsorption pump 2 is still about 0.2 atmospheres, so a significant volume of gas can still be withdrawn from the primary pot 5 by the secondary adsorption pump 6 through the conduit 7. It will be appreciated that the secondary adsorption pump adsorbs most of the coolant 15.

At step 106, as the secondary adsorption pump begins to saturate, the primary adsorption pump 2 is cooled by the heat switch and exchanger assembly 12 (at this time the heater 17 is off). This produces an initial pressure reduction due to the reduction in temperature of the region of the primary adsorption pump 2 from about 100 Kelvin to about 4 Kelvin. This further cools the primary pot 5.

Once the charcoal 8 within the primary adsorption pump 2 has reached its operational temperature of around 4 Kelvin, at step 107, the primary adsorption pump operates in a conventional manner by adsorption of the gas within the primary chamber 3, this causing a further reduction in the pressure and therefore the temperature of the liquid within the primary pot 5. The primary adsorption pump does not saturate even as the pressure reduces to below $10^{-6}$ atmospheres.

Notably, because the impedance of the conduit 7 is such that the flow of gas from the secondary adsorption pump 6 into the primary pumping line 4 is much smaller than the pumping speed of the primary adsorption pump 2, by a factor of 10 in the present example, the primary adsorption pump 2 will preferentially pump the gas from the pot 5 and there will only be a relatively small "leak" of gas pumped from the secondary adsorption pump 6. The pumping speed is more than sufficient to lower the temperature of the liquid in the primary pot 5 as desired. Furthermore, the small "leak" will also reduce over time since the secondary adsorption pump 6 continues to adsorb the remaining gas until the saturation limit of its charcoal 8 is reached.

During step 107, the cooled primary pot 5 therefore provides cooling for any experimental apparatus, such as sensors, or further cooling devices (such as a dilution refrigerator) that are thermally coupled to the pot 5. Such additional apparatus is generally represented by the target apparatus 20 in FIG. 1. Depending upon the heat load placed upon the primary pot 5 by the apparatus 20, the system may cool the apparatus at a stable base temperature for many hours.

Figure 3:
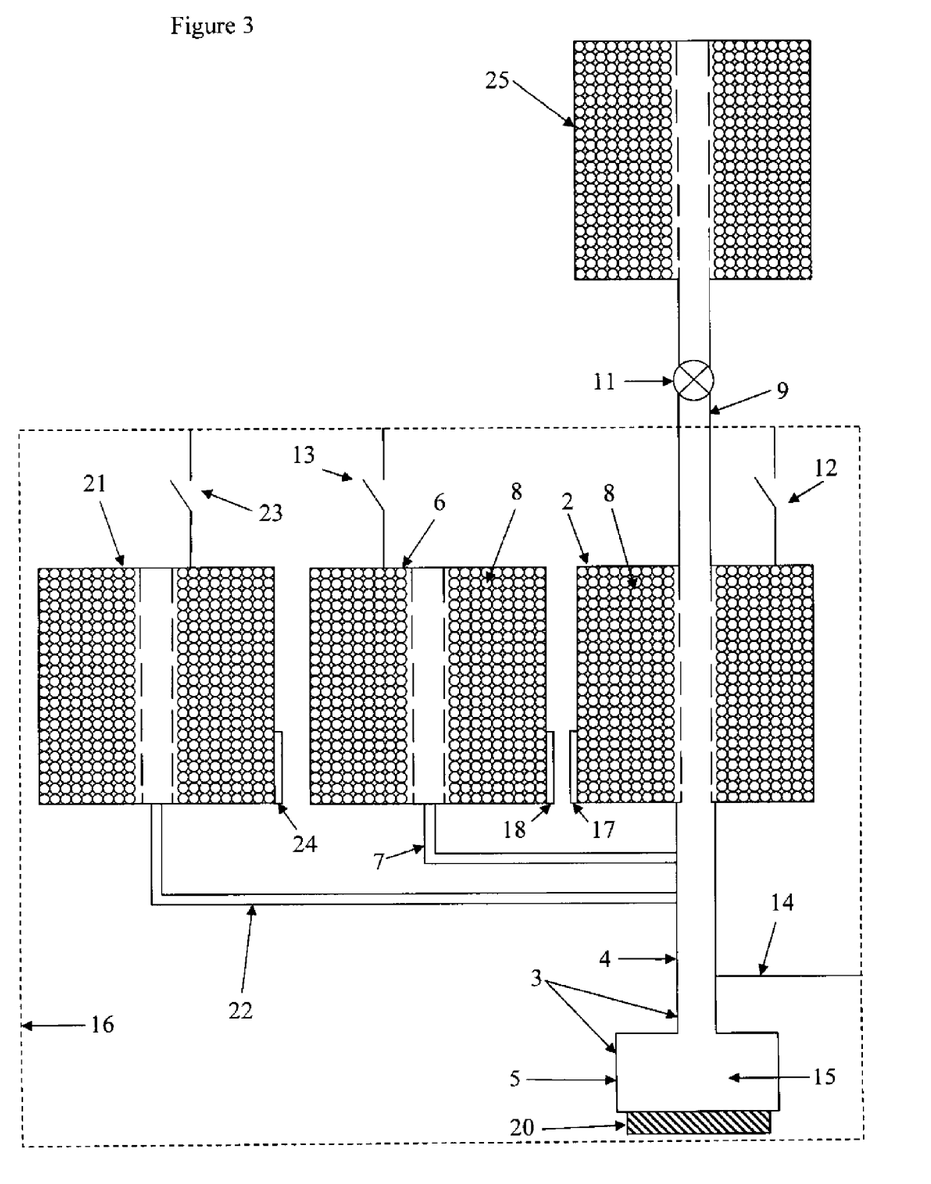
FIG. 3 shows a second example system with multiple secondary adsorption pumps.

A second example system is shown in FIG. 3. This is similar to the basic system of FIG. 1 except that it includes an additional secondary adsorption pump 21 and a corresponding additional high fluid impedance conduit 22, together with a respective additional heat switch and heat exchanger assembly 23 and heater 24. The additional secondary adsorption pump 21 is coupled to the primary chamber 3 using the high fluid impedance conduit 22 which is similar to the conduit 7.

A further distinction between the systems of FIG. 3 and FIG. 1 is that in this example the vessel 10 is replaced by a large capacity further adsorption pump 25. This may be used either for the initial filling of the system in step 101 of FIG. 2, or for the optional step 104 in FIG. 3, or indeed each of these. The additional secondary adsorption pump 21 together with the high fluid impedance conduit 22 can be used in parallel (at the same time) during step 105. However, preferably the adsorption pumps 2, 21 are operated sequentially such that the secondary adsorption pump 6 is operated first until approaching its saturation limit, and then the second pump 21 is operated (by turning off the heater 24 and cooling using the heat exchanger 23).

Figure 4:
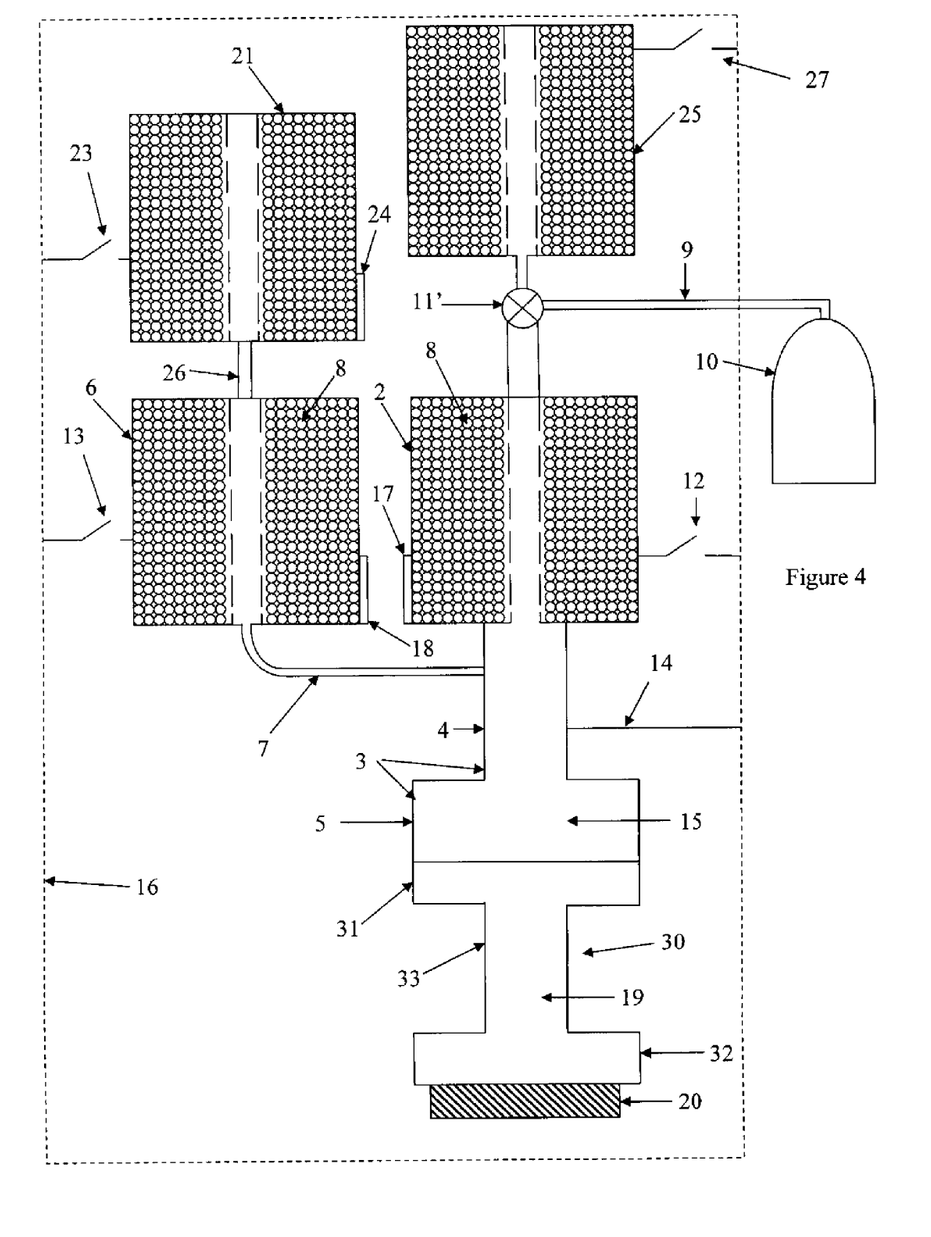
FIG. 4 shows a third example system using a heat pipe.

Turning now to FIG. 4, a further example system is provided in which, again, as for FIG. 3, the additional secondary adsorption 21, together with heat exchanger 23 and heater 24 are each provided. In this case however, the additional adsorption pump 21 is provided in series with the secondary adsorption pump 6 through an additional high fluid impedance conduit 26. During operation, in step 105 of FIG. 2, in this example the pump 21 is cooled first while the pump 6 is maintained at the higher temperature (from step 103). Once the pump 21 is substantially saturated with coolant, pump 6 is then brought into adsorptive operation by cooling it using the heat exchanger 13 (and associated heat switch).

In a further modification of the system, it will be noted that the example of FIG. 4 contains a large capacity adsorption pump 25 (and heat switch and heat exchanger assembly 27) in addition to the storage vessel 10. In this case, a modified valve 11' is provided, this being adapted to have three operational positions, one placing the vessel 10 in communication with the primary chamber 3, the second placing the pump 25 in communication with the primary chamber 3, and the third position being to seal the tube 9. In this case, the vessel 10 may be used for example to charge the system during step 101 in FIG. 2, and the adsorption pump can be used to form step 104. The reverse situation is also contemplated.

The example in FIG. 4 differs further from the earlier examples in that in this example a heat pipe is provided in thermal communication with the chamber 5.

The heat pipe is illustrated at 30 in FIG. 4. This comprises an elongate hollow cylinder fabricated from a suitable low thermal conductivity cryogenic alloy such as stainless steel. Typically this is vertically oriented and has an upper region 31 and a lower region 32, separated by an intermediate region in the form of a tube 33. This tube is oriented substantially vertically when in use. The heat pipe is a sealed vessel containing a second coolant 19. The choice of second coolant 19 may be determined based upon the application and may be either a gas, liquid or a mixture of both. Further, the second coolant 19 may be the same type as coolant 15, such as helium-3. The lower region 32 is provided in contact with target apparatus to be cooled. In this particular example one can think of the apparatus as being an extremely sensitive particle or radiation detector.

The upper region 31 is placed in good thermal contact with the primary pot 5. Under normal operating conditions, the amount and type of coolant within the heat pipe is chosen such that coolant 19 is present within the heat pipe when the adsorption refrigeration system is in operation. Some of the coolant may also be present in the liquid phase. As the temperature of the pot 5 drops during the latter steps of FIG. 2, the temperature of the upper region of the heat pipe 30 reduces and this causes condensation of coolant 19 within the heat pipe onto the surface of the upper region 31. Droplets then form and these eventually detach from the upper region and fall under gravity through the tube 33 to the lower region 32. The temperature of the droplets is substantially the same as that of the pot 5 and therefore the gradual accumulation of coolant droplets in the lower region 32 causes the lower region to attain a temperature substantially the same as that of the primary pot 5. Such a temperature is typically 200 to 300 millikelvin. The target apparatus 20 is in turn cooled by a good thermal communication with the lower region 32.

The heat pipe therefore effectively operates as a heat diode and provides a strong cooling effect while separating the target apparatus 20 from any temperature fluctuations which occur in the primary pot 5. The vapour in the tube 30 also acts as a good thermal barrier to any sources of heat from the apparatus above. At the end of the single-shot cycle of the primary adsorption pump 2 the heat pipe therefore acts as a thermal barrier which allows a lengthening of the experimental time during which the target apparatus 20 can be used at an operational temperature. This also means that, when using the apparatus in a further single-shot cycle later, following recharging, the target apparatus 20 may already be at a low temperature and therefore requires less cooling than would otherwise be required.

Figure 5:
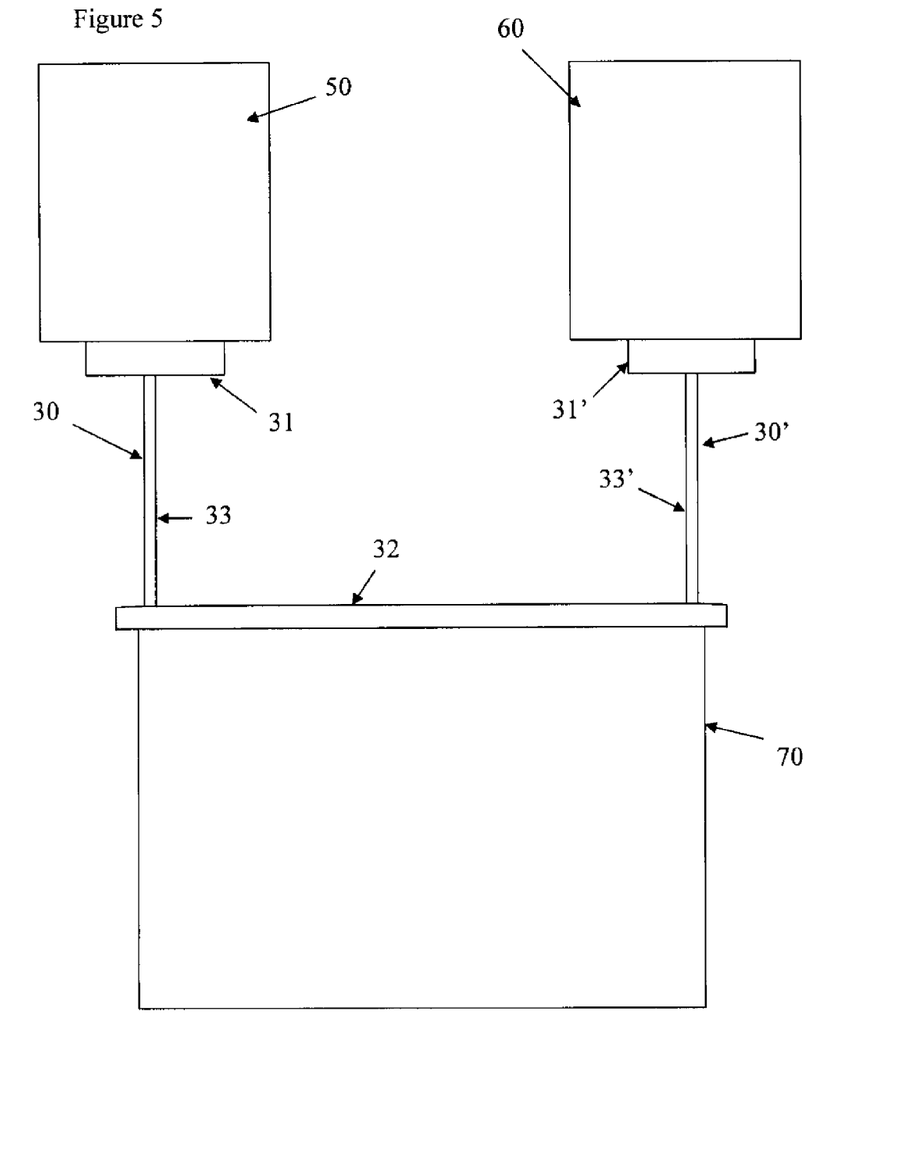
FIG. 5 shows a fourth example using multiple instances of the systems of the first, second or third examples; and, FIG. 6 shows a fifth example using multiple instances of the systems of the first, second or third examples.

In FIG. 5 two instances of adsorption refrigeration systems are shown at 50 and 60 respectively. Each of these schematically represents a cooling system according to the first, second or third examples described earlier (or a mixture). In this example, each of the primary pots of the systems 50, 60 are thermally coupled to the upper regions of two heat pipes 30, 30', these each having upper regions 31, 31', tubes 33, 33', together with lower region 32. It will be noted that the lower region 32 provides cooling of a dilution unit indicated schematically at 70.

In use, the systems 50 and 60 are operated alternately such that a pseudo-continuous operation of the dilution refrigerator is provided. Specifically, at any one time, one of the systems 50, 60 is in an operational cooling mode, whereas the other is in a recharging mode.

Figure 6:
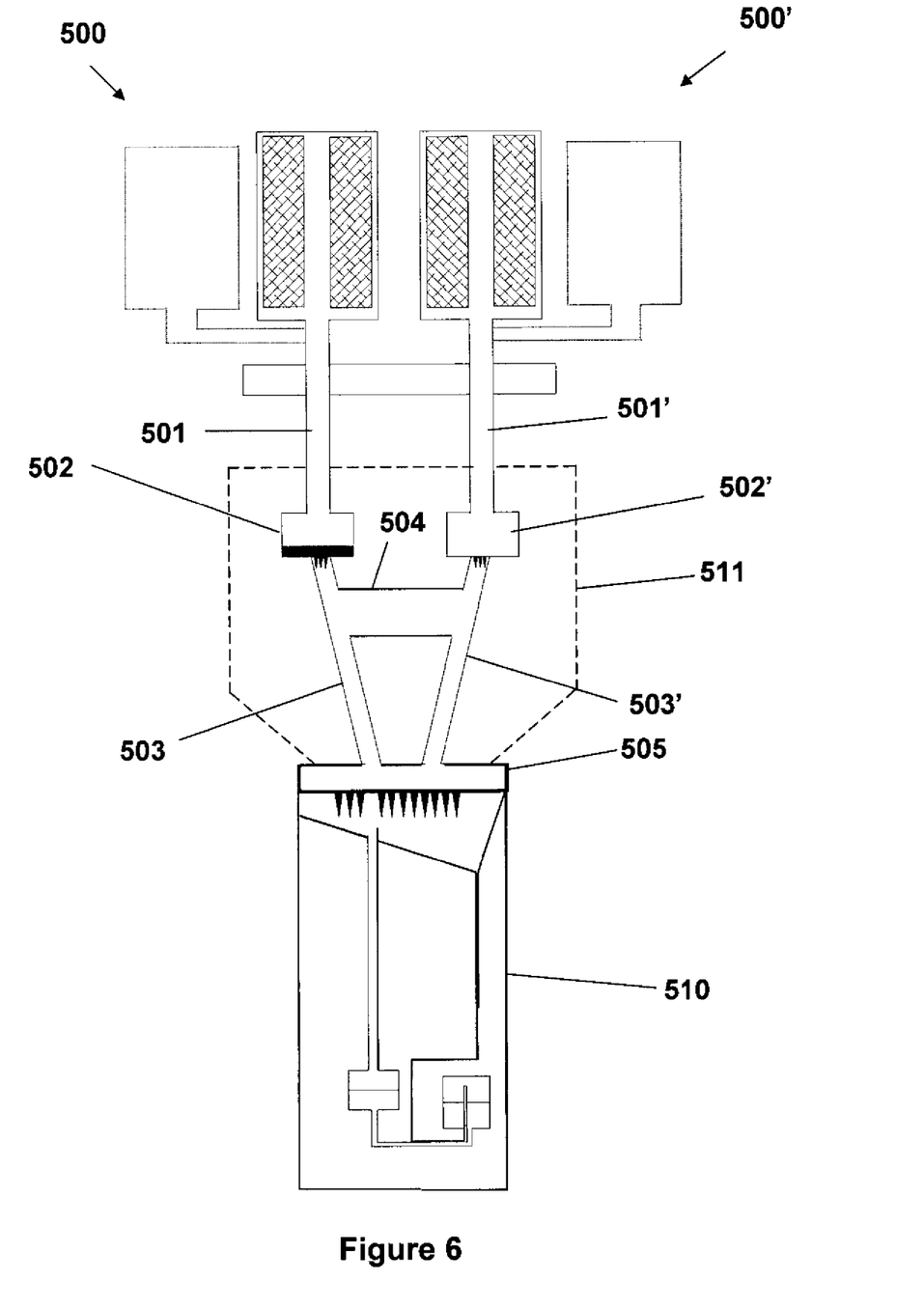

FIG. 6 shows a further example in which, in an analogous manner to FIG. 5, two instances of adsorption refrigeration systems are used in combination. The respective systems are illustrated at 500 and 500' respectively. It should be noted that these systems are generally illustrative of any of the examples discussed earlier. The additional apparatus such as denoted by reference numerals 10, 11, 21, 25 and so on in earlier examples is not shown in FIG. 6 for clarity purposes despite being present in practice. FIG. 6 illustrates that there are two instances of the primary pumping lines 501, 501', these having an equivalent function to the primary pumping line 4 discussed with reference to the earlier examples. Similarly, primary pots 502, 502' (analogous to primary pot 5) are also provided coupled to the primary pumping lines 501, 501'. In turn, each of the primary pots 502, 502' are coupled to respective heat pipes 503, 503' in a similar manner to those discussed at 30, 30' earlier. The upper regions in each of the heat pipes 503, 503' are connected together using a large tube 504, this having a low hydraulic impedance. Each of the heat pipes 503, 503' opens into a lower common cold platform 505. As illustrated in FIG. 6, this is in thermal communication with the still of a dilution refrigerator, the dilution refrigerator generally being indicated at 510. The apparatus described is directly analogous to the apparatus discussed in our co-pending European patent application having the application number 06254236.0. Specifically, the apparatus is equivalent to that shown in FIG. 3 of 06254236.0 and, likewise, it is anticipated that the heat pipes 503, 503' could be replaced by a common enclosure 511 as is indicated by the dashed lines in FIG. 6.

As will be appreciated, the apparatus illustrated in FIG. 6 is also preferably used in a pseudo-continuous operation in a similar manner to that of FIG. 5. Specifically, one of the systems 500, 500' is operated while the other is regenerated and prepared for a later operational state. This allows continuous operation of the dilution refrigerator 510. As will be appreciated, the dilution refrigerator 510 is one of a number of different types of target apparatus which may be cooled using the system.

Each of the examples described above is illustrative of how the secondary adsorption pump (whether there be one or more of these) can be used with one or more respective high fluid impedance conduits so as to provide pre-cooling of the primary chamber 3, thereby providing a good single-shot time for the apparatus and avoiding mechanical vibrations. It will be appreciated that each of the individual distinctions between the apparatus arrangements of the examples described can be used interchangeably with those in other examples. While the present examples have been discussed with reference to helium-3 coolant, higher cryogenic temperature (<100 Kelvin) variants using other coolants are also contemplated.

It should also be emphasized that the above-described embodiments of the present invention, particularly, any "preferred" embodiments are merely possible examples of implementations, merely set forth for a clear understanding on the principles of the invention. Many variations and modifications may be made to the above-described embodiment(s) of the invention without departing substantially from the spirit and principles of the invention. All such modifications and variations are intended to be included herein within the scope of this disclosure and the present invention, and protected by the following claims.

What is claimed is:

1. A method of operating an adsorption refrigeration system, the system comprising a primary adsorption pump which, in use, is arranged in communication with a primary chamber containing coolant, a secondary adsorption pump and, a high fluid impedance conduit being arranged to place the secondary adsorption pump and the primary chamber in fluid communication, the method comprising:
    (i) charging the primary and secondary adsorption pumps with coolant while the primary and secondary adsorption pumps are at their respective operational temperatures;
    (ii) heating each of the primary and secondary adsorption pumps above their operational temperatures to desorb the coolant such that the coolant pressure in the primary chamber and the secondary adsorption pump substantially equalizes through the high fluid impedance conduit;
    (iii) cooling the desorbed coolant in the primary chamber while heating the primary and secondary adsorption pumps;
    (iv) cooling the secondary adsorption pump to its operational temperature at which coolant gas is adsorbed by the secondary adsorption pump, thereby causing a first reduction in temperature and pressure of the coolant in the primary chamber; and
    (v) cooling the primary adsorption pump to an operational temperature at which coolant is adsorbed by the primary adsorption pump, thereby causing a second reduction in temperature and pressure of the coolant in the primary chamber.

2. A method according to claim 1, wherein the respective operational temperatures of the primary and secondary pumps are temperatures at which gaseous coolant is substantially adsorbed.

3. A method according to claim 1, wherein during step (iv) the coolant precipitates as liquid coolant.

4. A method according to claim 1, wherein the system further comprises an auxiliary reservoir arranged in selective fluid communication with the primary chamber interior and wherein coolant is supplied from the auxiliary reservoir in step (i).

5. A method according to claim 1, wherein the system further comprises an auxiliary reservoir arranged in selective fluid communication with the primary chamber interior and wherein the coolant in the primary chamber is expanded into the auxiliary reservoir after or during step (iii) so as to further cool the coolant within the primary chamber.

6. A method according to claim 4, further comprising controlling the temperature of the auxiliary reservoir so as to provide a predetermined coolant pressure within the auxiliary reservoir.

7. A method according to claim 4, wherein the selective fluid communication between the auxiliary reservoir and the primary chamber is provided by operating a valve.

8. A method according to claim 1, wherein the coolant is helium-3.

9. A method according to claim 8, wherein the temperature of the coolant at the end of step (iv) is about 2 Kelvin.

10. A method according to claim 9, wherein during step (v) the coolant is cooled to 300 milliKelvin or lower.

11. A method according to claim 1, wherein step (v) comprises a step of cooling the primary adsorption pump from a temperature in excess of the operational temperature to the operational temperature, and a subsequent step of cooling the coolant in the primary chamber at or below the operational temperature at which the substantial adsorption of coolant occurs.

* * * * *